United States Patent Office 3,497,472
Patented Feb. 24, 1970

3,497,472
POLYESTERS OF ADAMANTANEDIOLS AND AROMATIC TETRACARBOXYLIC ACID DIANHYDRIDES
Gary L. Driscoll, Boothwyn, Pa., assignor to Sun Oil Company, Philadelphia, Pa., a corporation of New Jersey
No Drawing. Filed Dec. 5, 1967, Ser. No. 688,009
Int. Cl. C08g 17/04
U.S. Cl. 260—75                   8 Claims

ABSTRACT OF THE DISCLOSURE

A novel polyester that is soluble in polar or weakly basic aqueous solutions is prepared by reacting an adamantane diol with a aromatic tetracarboxylic acid dianhydride. For example 1,3-dihydroxy-5,7-dimethyladamantane is reacted with pyromellitic dianhydride in a N,N-dimethyl-formamide solvent to prepare a poly (5,7-dimethyl adamantylene pyromellitate) which is soluble in a 5% aqueous solution of sodium bicarbonate.

BACKGROUND OF THE INVENTION

Adamantane (tricyclo-[3.3.1.1$^{3,7}$]decane) has a carbon structure containing ten carbon atoms arranged in a completely symmetrical, strainless manner, wherein four of the carbon atoms are in bridgehead positions in the rings. The typographical structure of adamantane is often represented as:

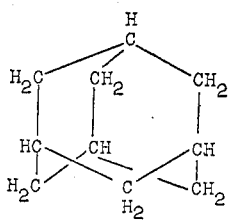

There are four tertiary hydrogen atoms, one at each bridgehead carbon atom. All four bridgehead carbon atoms are equivalent to each other and likewise all rings are equivalent.

The preparation and use of monoesters of 1-adamantane carboxylic acid is taught in the prior art by Spengler et al., Erdol and Kohle-Erdgas-Petrochemie, vol. 15, pages 702–707 (September, 1962).

The preparation and use of monoesters of 1-adamantane diol is taught in U.S. Patent 3,081,337.

The preparation and use of diesters containing an adamantane nuclei is shown in the application of Irl N. Duling and Abraham Schneider, Ser. No. 531,059, filed Mar. 2, 1966 now Patent No. 3,398,165.

A polyester produced from the dimethyl ester of 1,3-adamantane diacid and 1,5-bicyclo (2.2.2.) octane dimethanol is shown in French Patent 1,374,693.

The preparation and use of linear polyester prepared from alkyladamantane diol and organic diacids is shown in the application of Irl N. Duling, Abraham Schneider and Gary L. Driscoll, Ser. No. 586,825, filed Oct. 14, 1966.

SUMMARY OF THE INVENTION

The present invention relates to a novel group of polyesters containing an adamantane moiety and having the structure

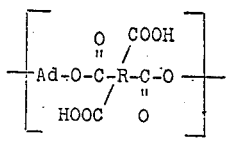

where Ad is the adamantane moiety and R is a tetravalent organic radical. More specifically the adamantane moiety is derived from an adamantane diol and the acid moiety is derived from a tetracarboxylic organic acid dianhydride.

Briefly stated the invention is a polyester comprising an aromatic tetracarboxylic acid dianhydride wherein all four carbonyl groups of said dianhydride are attached to an aromatic ring of said anhydride and an adamantane diol having the formula

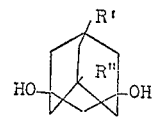

wherein R' and R'' have 0 to 20 carbon atoms independently selected from the group consisting of hydrogen, alkyl, cycloalkyl and aryl. The polyester can be described as having the recurring unit

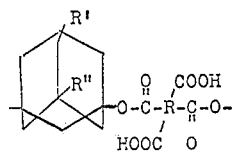

where R' and R'' have 0–20 carbon atoms independently selected from the group consisting of hydrogen and hydrocarbyl and R is a tetravalent organic radical containing at least one ring of six carbon atoms, said ring characterized by benzenoid unsaturation, each carboxy group being attached to a carbon atom in a ring having benzenoid unsaturation, said carboxy group being adjacent to a carbonyloxy group. By the term carboxy is meant the radical —COOH, by the term carbonyloxy is meant the radical

and the term hydrocarbyl is used to designate a hydrocarbon radical.

DESCRIPTION OF THE INVENTION

The novel group of polyesters is characterized by the recurring unit having the following structure

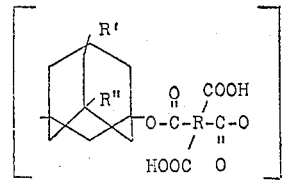

wherein R' and R" have 0–20 carbon atoms independently selected from the group consisting of hydrogen and hydrocarbyl, preferably R' and R" are selected from the group consisting of hydrogen, alkyl, cycloalkyl and aryl, R is a tetravalent organic radical containing at least one ring of six carbon atoms, said ring characterized by benzenoid unsaturation, each carboxy group being attached to a carbon atom in a ring having benzenoid unsaturation, adjacent to a carbonyloxy group.

Generally the polyester will have from 10 to 300 repeating units, preferably from 25 to 150. Suitable polyesters will have number average molecular weights in the range of 2000 to 100,000, depending upon the degree of polymerization and the particular R groups.

The polyesters are prepared by reacting at least one adamantane diol of the structural formula

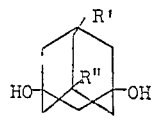

wherein R' and R" have 0–20 carbon atoms independently selected from the group consisting of hydrogen, alkyl, cycloalkyl and aryl with at least one tetracarboxylic acid dianhydride having the structural formula

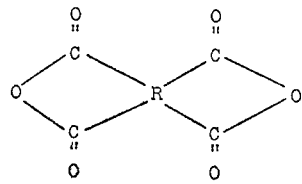

wherein R is an organic radical containing at least one ring of six carbon atoms, said ring characterized by benzenoid unsaturation, the carbonyl groups being attached in pairs to adjacent carbon atoms in a ring having benzenoid unsaturation.

The admantane starting material used to produce the present polyesters is an adamantane having the general formula

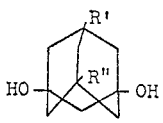

where R' and R" have the significance previously given.

The alkyl or cycloalkyl adamantane compounds can be produced according to the method disclosed by Schneider et al., Journal of the American Chemical Society, vol. 86, pages 5365–5367.

The arylated adamantane compounds can be produced be reacting a bromo-adamantane compound with an excess of aromatic compound in a procedure such as that employed by Stetter et al., Ber. 97 (12) pages 3488–92 (1964).

The substituted adamantane for the present invention can have either non-branched or branched alkyl groups and can have one or more cycloalkyl or aryl radicals in the substituted adamantane moiety with the total number of carbon atoms in each R group ranging up to 20. The diols of adamantane and alkylated adamantanes can be produced by reacting the parent hydrocarbon with chromic acid according to the procedure disclosed in the co-pending application of Robert E. Moore, Ser. No. 421,614, filed Dec. 28, 1964 now Patent No. 3,383,424. This procedure will also produce the diols of the arylated adamantanes.

Examples of such reactants are the 5,7-dihydroxy derivatives of the following hydrocarbons: adamantane; 1-methyladamantane; 1 - ethyladamantane; 1,3 - dimethyladamantane; 1-methyl - 3 - ethyladamantane; 1,3-diethyl- adamantane; 1-n-propyladamantane; 1-isopropyladamantane; 1-n-butyladamantane; 1,3-di-n-pentyladamantane; 1-methyl - 3 - heptyladamantane; 1-n-decyladamantane; 1-n-decyl-3-ethyladamantane; 1 - methyl - 3 - propyladamantane; 1-isohexyladamantane; 1 - methyl-3-cyclohexyladamantane; 1-phenyladamantane; 1-methyl - 3 - phenyladamantane; 1,3-diphenyladamantane and the like.

In regard to the structure given above, the substituents specified at the bridgehead positions R' and R" can be hydrogen atoms. These are active sites constituting spots in the molecule where oxidation and peroxide formation can occur. Preferred compositions have no tertiary hydrogen atoms in the adamantane moiety, thus in preferred compositions R' and R" will be selected from the group consisting of alkyl, cycloalkyl and aryl. More preferably because of the ease with which they can be obtained, the bridgehead substituents will be methyl or ethyl or both.

The tetracarboxylic acid dianhydrides are characterized by the following formula

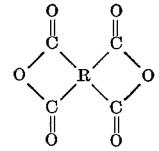

wherein R is a tetravalent organic radical containing at least 6 carbon atoms characterized by benzenoid unsaturation, wherein the 4 carbonyl groups of the dianhydride are each attached to separate carbon atoms and wherein each pair of carbonyl groups is directly attached to adjacent carbon atoms in the R group to provide a 5-membered ring as follows:

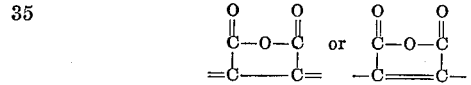

Illustrations of dianhydrides suitable for use in the present invention include: pyromellitic dianhydride; 1,2,3,4-benzenetetracarboxylic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 2,2',3,3'-diphenyl tetracarboxylic dianhydride; 2,2-bis(3,4-dicarboxyphenyl) propane dianhydride; bis(3,4-dicarboxyphenyl) sulfone dianhydride; perylene 3,4,9,10-tetracarboxylic acid dianhydride; bis(3,4-dicarboxyphenyl) ether dianhydride; naphthalene-1,2,4,5-tetracarboxylic dianhydride; 2,2-bis(2,3-dicarboxyphenyl) propane dianhydride; 1,1-bis(2,3-dicarboxyphenyl) ethane dianhydride; 1,1-bis(3,4-dicarboxyphenyl) ethane dianhydride; bis(2,3-dicarboxyphenyl) methane dianhydride; bis(3,4-dicarboxyphenyl) methane dianhydride; 3,4,3',4'-benzophenone tetracarboxylic dianhydride and the like.

The dianhydrides are employed because of their increased reactivity over the acids per se which is necessary to overcome the relatively low reactivity of the adamantane diols, in particular the substituted adamantane diols.

The tetracarboxylic acid dianhydride starting material is characterized in that the carbonyl groups are situated on ring structure so that each carbonyl group is in an adjacent position to at least one other carboxyl group. This positioning of carboxyl groups is essential to production of uncrosslinked linear polyesters. It would be expected that tetrafunctional dianhydride would produce a highly crosslinked polyester. However, it has been found that the present polyesters are not crosslinked. It is believed that mechanism of this result is as follows. When one carbonyl group has esterified with the adamantane diol, the bulk of the adamantane moiety sterically hinders the reaction of another adamantane diol at a carboxyl group adjacent to the esterified group. Other positions on the ring nucleus are unhindered in this manner. It is understood that the above mechanism is proposed to explain the result and is not to be considered to limit the scope of the present invention regardless of the mechanism involved. The polyesters can, however, be crosslinked if desired by heating them in the absence of a solvent.

In carrying out the polyesterification, stoichiometric proportions can be used. Generally a molar ratio of acid reactant to adamantane diol reactant in the range of 0.95:1.0 to 1.0:1.10 will be used in carrying out the reactions. Preferably a slight excess of the adamantane diol is used so that the terminal moieties are adamantyl.

Preparation of linear polyesters using the bridgehead diols alkyladamantanes is not as readily accomplished as when aliphatic glycols are employed. Attachment of the hydroxyl group at the bridgehead carbon of the adamantane nucleus makes the group relatively inactive. Hence, many of the known methods of producing polyesters may not be suitable for making the products of the present invention. For example, melt condensation of the 1,3-diol with an aromatic tetrafunctional acid material generally is not a suitable way of preparing the polyester because of the possibility of crosslinking unless care is taken to maintain the temperature of the reaction below that at which substantial cross-linking occurs.

A suitable procedure, however has been found. The polyesterifications were carried out in conventional solvents such as dimethylformamide or dimethylacetamide. A conventional acidic catalyst such as p-toluenesulfonic acid is desirable. The polyester can be separated from the solvent by addition of water. The process of polymerization is fully set forth in the examples.

The polyesters of the present invention are soluble in polar solvents such as hexamethylphosphoramide and acetone and in aqueous sodium bicarbonate due to salt formation.

The crosslinked polyesters, are not soluble in aqueous solutions and can be employed as cation exchange resins, usually in the form of beads. The polyesters can be partially crosslinked for example with ethylene glycol, diethylene glycol, propylene glycol, diisocyanates and the like. The partially crosslinked low molecular weight polyesters are insoluble in aqueous solutions but retains sufficient free acid groups to be suitable cation exchange resins. It is also possible to crosslink with divalent or higher cations such as Ca++, Ba++, Al³+, Zn++, etc. These polymers known as "ionomers" have weak crosslinking bonds which leave them thermoplastic but unusually strong.

The linear polyesters have excellent adhesion to glass, metal, wood, paper, and other material and can be applied from solution or as hot melt to produce laminates or corrugated paper board.

The examples presented herein are intended to be merely illustrative. Certain ratios of reactants have been specified. It is to be understood that those of skill in the art will be able to select the respective proportion from each range so as to produce compositions within the spirit and scope of the invention as disclosed. The examples provide guidelines to indicate to those of skill in the art the means and manner of reactant selection, procedures for utilizing the reactants, and the general nature of the polyesters to be obtained.

EXAMPLE 1

1,3-dihydroxy-5,7-dimethyladamantane (3.92 g.=.020 moles) and pyromellitic dianhydride (4.36 g.=.020 moles) in N,N-dimethylformamide (25 ml.) were stirred at 60° C. for five hours in the presence of p-toluenesulfonic acid (.10 g.) as a catalyst. The flow time of the solution was periodically monitored by means of an uncalibrated capillary tube until no more viscosity increase was noted. Water (50 ml.) was added to precipitate the polymer. The white solid polymer was filtered off and dried under vacuum. The yield was 7.92 g. (95.6%). The infrared spectrum of the polymer (in mineral oil) showed both ester and free carboxylic acid bands.

EXAMPLE 2

In order to further demonstrate the presence of free carboxylic acid groups, part of the above polymer was added to 5% aqueous sodium bicarbonate solution (20 ml.). It completely dissolved with evolution of carbon dioxide. Solid, white, polymer was precipitated by addition of acetone (40 ml.). This was the sodium salt of the polymer. The infrared spectrum of this polymer showed ester and carboxylic acid salt bands.

The invention claimed is:

1. A polyester having the recurring unit

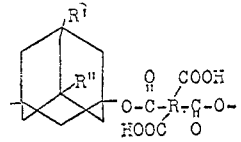

wherein R' and R" have 0-20 carbon atoms independently selected from the group consisting of hydrogen and hydrocarbyl and R is a tetravalent organic radical containing at least one ring of six carbon atoms, said ring characterized by benzenoid unsaturation, each carboxy group being attached to a carbon atom in a ring having benzenoid unsaturation, said carboxy group being adjacent to a carbonyloxy group.

2. A polyester according to claim 1 wherein R' and R" are selected from the group consisting of hydrogen, alkyl, cycloalkyl and aryl.

3. A polyester according to claim 2 wherein there are 10 to 300 repeating units.

4. A polyester according to claim 3 wherein there are 25 to 150 repeating units.

5. A polyester according to claim 2 wherein R' and R" are selected from the group consisting of alkyl, cycloalkyl and aryl.

6. A polyester according to claim 5 wherein R' and R" are methyl.

7. A polyester according to claim 6 wherein R is a tetravalent benzene ring.

8. A polyester according to claim 7 wherein the carboxy and carbonyloxy groups are at the 1,2,4,5 positions on the benzene ring.

References Cited

UNITED STATES PATENTS 3,342,880   9/1967   Reinhardt _____ 260—648

OTHER REFERENCES

Stetter et al., Agnew, Chem. 77, 171 (1965).

WILLIAM H. SHORT, Primary Examiner

M. GOLDSTEIN, Assistant Examiner

U.S. Cl. X.R.

161—194, 214, 231, 270; 260—2.2, 29.2, 30.6, 32.8, 475